(No Model.)

M. RANDOLPH.
ANTI FRICTION JOURNAL BEARING.

No. 356,331. Patented Jan. 18, 1887.

Witnesses.
W. J. Graham.
Eugene V. L. Randolph.

Inventor.
M. Randolph

UNITED STATES PATENT OFFICE.

MAHLON RANDOLPH, OF NEW YORK, N. Y., ASSIGNOR TO THE RANDOLPH MANUFACTURING COMPANY, OF NEW YORK.

ANTI-FRICTION JOURNAL-BEARING.

SPECIFICATION forming part of Letters Patent No. 356,331, dated January 18, 1887.

Application filed November 17, 1886. Serial No. 219,141. (No model.)

*To all whom it may concern:*

Be it known that I, MAHLON RANDOLPH, of the city, county, and State of New York, have invented a new and useful Improvement in Anti-Friction Journal-Bearings; and I hereby declare the following to be a full and clear description thereof.

This invention relates to an anti-friction bearing for journals and all forms of moving machinery, formed of different elements which are well known and in common use.

The invention will be readily understood by reference to the accompanying drawings, of which—

Figure 1:
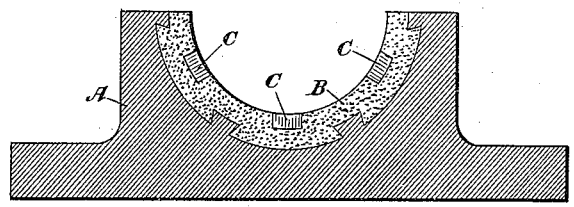
Figure 2:
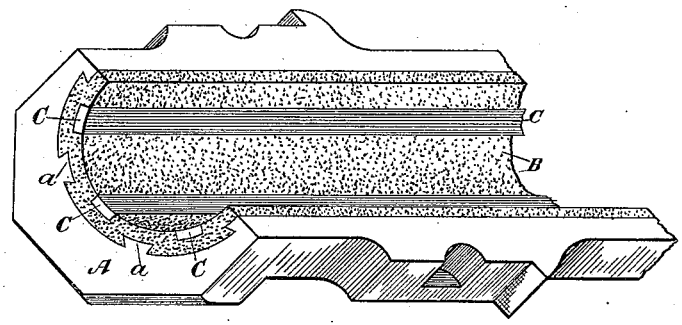
Figure 3:
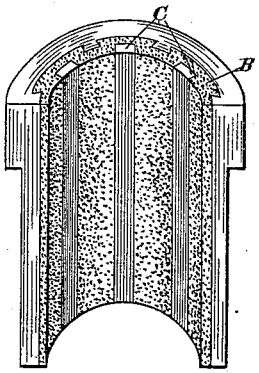
Figure 4:
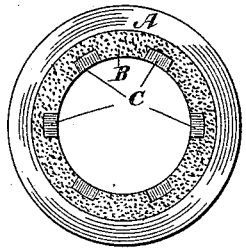

Figure 1 is a transverse sectional elevation of one of my improved journal-bearings. Fig. 2 is a perspective view of a railway journal-bearing. Figs. 3 and 4 are respectively a sectional elevation and a plan of a bearing for a spindle.

The metallic case A, with its locking-ribs $a$, and plastic bushing B, of an anti-friction material formed of plumbago and an adhesive mixture, are similar to the corresponding parts in Patents Nos. 349,055, 349,056, and 349,057, issued to me on the 14th day of September, 1886, and so need not be particularly described herein. In addition to the bearings so formed, and which are well adapted to most kinds of service, I now add bearing strips or surfaces made of vulcanized fiber, which I apply to the said bearings in the form of strips C, embedded in the anti-friction bushing or lining B while it is in a plastic state.

Having described my invention, I claim—

1. A journal or other machine bearing formed of vulcanized fiber and an anti-friction compound composed of plumbago and an adhering cement, combined together so as to form the bearing-surface partly of vulcanized fiber and partly of the lubricating plumbago compound, substantially as described.

2. In an anti-friction journal or machine bearing having a lubricating-surface of a compound of plumbago and an adhesive mixture, bearing-strips of vulcanized fiber embedded in the anti-friction material, substantially as described.

MAHLON RANDOLPH.

Witnesses:
 E. J. BUNKER,
 CHAS. EDGAR MILLS.